No. 673,030. Patented Apr. 30, 1901.
A. C. ROWE.
BARREL ROLLER.
(Application filed Aug. 30, 1900.)
(No Model.)

Inventor
A. C. Rowe,

Witnesses

By Victor J. Evans Attorney

THE NORRIS PETERS CO., PHOTO-LITHO., WASHINGTON, D. C.

UNITED STATES PATENT OFFICE.

ANDREW C. ROWE, OF LIVERMORE, KENTUCKY.

BARREL-ROLLER.

SPECIFICATION forming part of Letters Patent No. 673,030, dated April 30, 1901.

Application filed August 30, 1900. Serial No. 28,541. (No model.)

*To all whom it may concern:*

Be it known that I, ANDREW C. ROWE, a citizen of the United States, residing at Livermore, in the county of McLean and State of Kentucky, have invented new and useful Improvements in Barrel-Rollers, of which the following is a specification.

My invention relates to barrel-rollers; and one object is to provide a device of this character which will be adapted for use with barrels of different sizes and which may be readily attached to a barrel or detached therefrom.

Further objects of the invention will be disclosed hereinafter, and the construction will be fully described in connection with the accompanying drawings, which form a part of this specification, and its novel features will be particularly pointed out in the appended claims.

Figure 1:
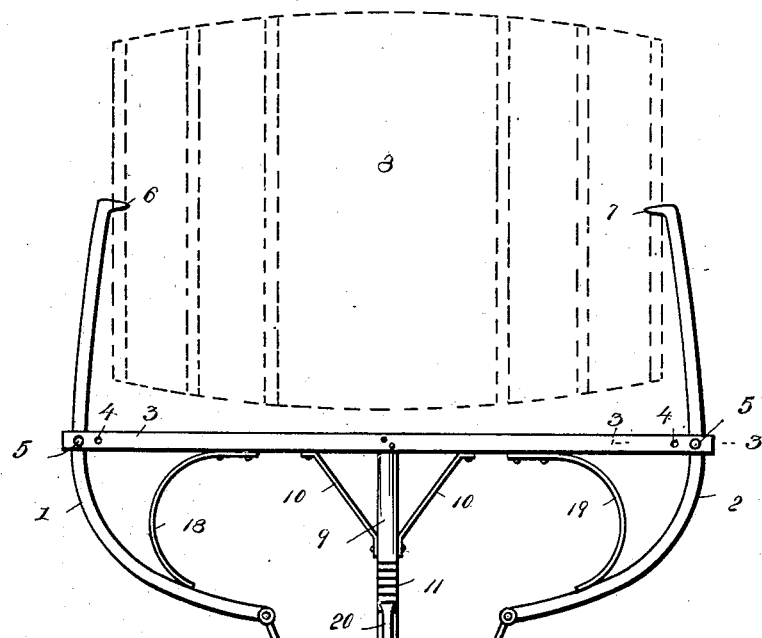
Figure 2:
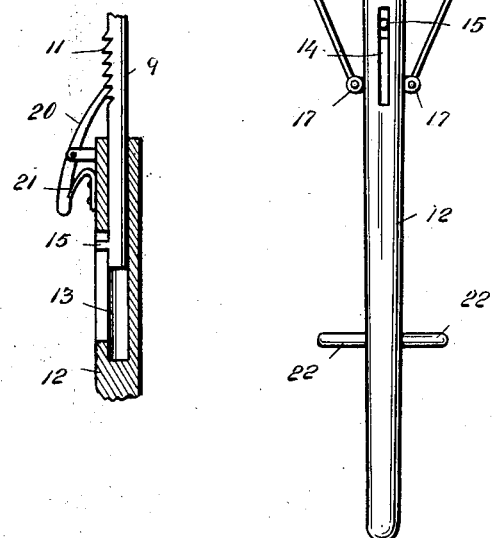
Figure 3:
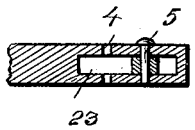

In the drawings, Figure 1 is a plan view of a barrel-roller embodying the invention, its application to a barrel being indicated by dotted lines. Fig. 2 is a longitudinal central section of the handle of the device, and Fig. 3 is a vertical section on line 3 3 of Fig. 1.

The reference-numerals 1 and 2 designate curved jaws or clamps pivotally secured to the ends of a cross-bar 3, said cross-bar being formed with a plurality of openings 4 to permit of the adjustment of the pivot-pins 5, which secure the jaws or clamps to the bar. The forward ends of the jaws 1 and 2 are formed with prongs 6 and 7, which are adapted to engage the heads of the barrel 8, as illustrated in Fig. 1. Projecting centrally from the cross-bar 3 is a rod 9, secured to the cross-bar 3 by inclined braces 10 and having its upper surface formed with ratchet-teeth 11.

12 designates the handle or tongue of the device, which is formed hollow for a portion of its length adjacent to its inner end, as illustrated at 13 in Fig. 2. The hollow portion of the tongue is also formed with an elongated slot 14, within which extends a screw or pin 15, suitably secured near the end of the rod 9.

The rear ends of the jaws 1 and 2 are pivotally secured, by means of links 16, to lugs 17, projecting from opposite sides of the tongue 12, and between the rear ends of said jaws 1 and 2 and the rear side of the cross-bar 3 are interposed oppositely-curved springs 18 and 19.

Upon the upper surface of the tongue 12 is fulcrumed a pawl 20, provided with a retaining-spring 21, which normally holds said pawl in engagement with one of the ratchet-teeth 11, formed on the rod 9. Suitable handholds 22 project from opposite sides of the tongue or handle 12 to facilitate the manipulation of the barrel.

As illustrated in Fig. 3, the ends of the cross-bar 3 are formed with elongated slots 23, through which the jaws or clamps 1 and 2 extend, and these slots 23, in connection with the plurality of pin-openings 4 in the cross-bar 3, permit the tongues to be adjusted for barrels of different size.

The operation of the device constructed as above described is as follows: When the tongue or handle 12 is pushed toward the cross-bar 3, the jaws or clamps 1 and 2 are spread apart sufficiently to permit them to pass over the chime of the barrel, and when the handle is drawn in the opposite direction the jaws or clamps are turned upon their pivotal supports, causing them to firmly engage the heads of the barrel, the springs 18 and 19 serving to hold said jaws or clamps in contact with the barrel-heads. As the clamps contact with the barrel-heads before said clamps are entirely closed, or, in other words, before the limit of movement controlled by the projection 15 on the rod 9 is reached, the strain or draft upon the tongue 12 in rolling the barrel will tend to force the prongs of the clamps 1 and 2 into firm engagement with the ends of the barrel. As only the prongs or pins 6 and 7 engage the barrel, the latter will revolve on said prongs, which serve as axes therefor.

The pawl-and-ratchet device is designed for the purpose of locking the clamps 1 and 2 in position while the barrel is being rolled down steep grades or inclines, and when the tongue is drawn violently and the pins of the clamps are driven into the barrel-heads the pawl by engagement with one of the ratchet-teeth 11 prevents the clamps from spreading apart while pushing backward on said tongue to check the speed of the barrel.

The operator may walk either in front or behind the barrel, or, in other words, the barrel may be rolled either by pushing or pulling on the handle, as desired.

I claim—

1. A barrel-roller, comprising a tongue or handle, a rod longitudinally adjustable with relation to said handle; a cross-bar secured to said rod; curved jaws or clamps pivotally and adjustably secured to the ends of said cross-bar, and having a link connection with said handle; springs interposed between the rear ends of said jaws and the rear side of the cross-bar; and means for locking the rod at different adjustments with relation to the handle.

2. A barrel-roller comprising a handle formed hollow adjacent to one end thereof, and with an elongated slot; a rod fitting within the hollow end of the handle and having a projection extending into said elongated slot and formed with a plurality of ratchet-teeth; a cross-bar secured to one end of said rod; curved jaws or clamps pivotally secured to the ends of said cross-bar; links connecting the ends of said jaws with said handle; springs interposed between the jaws and cross-bar; and a spring-pawl carried by the handle and coöperating with the ratchet-teeth of said rod.

In testimony whereof I affix my signature in presence of two witnesses.

ANDREW C. ROWE.

Witnesses:
CLARENCE HODGE,
AUGUSTUS B. RILEY.